(12) United States Patent
Kim

(10) Patent No.: US 9,996,260 B2
(45) Date of Patent: Jun. 12, 2018

(54) TERMINAL AND METHOD FOR OPERATING SAME

(71) Applicant: LG ELECTRONICS INC., Seoul (KR)

(72) Inventor: Jaewoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 498 days.

(21) Appl. No.: 14/766,312

(22) PCT Filed: Feb. 7, 2013

(86) PCT No.: PCT/KR2013/000987
§ 371 (c)(1),
(2) Date: Aug. 6, 2015

(87) PCT Pub. No.: WO2014/123260
PCT Pub. Date: Aug. 14, 2014

(65) Prior Publication Data
US 2015/0370477 A1 Dec. 24, 2015

(51) Int. Cl.
*G06F 3/0488* (2013.01)
*G06F 3/0486* (2013.01)
(Continued)

(52) U.S. Cl.
CPC ........ *G06F 3/04886* (2013.01); *G06F 3/0233* (2013.01); *G06F 3/0236* (2013.01);
(Continued)

(58) Field of Classification Search
CPC ............... G06F 3/04886; G06F 3/0486; G06F 3/04883; G06F 3/04847; G06F 3/0233;
(Continued)

(56) References Cited

U.S. PATENT DOCUMENTS 8,584,049 B1 * 11/2013 Zhai ..................... G06F 17/24
715/702
2007/0247441 A1 10/2007 Kim et al.
(Continued)

FOREIGN PATENT DOCUMENTS

KR 10-2006-0011510 A 2/2006
KR 10-0620014 B1 9/2006
(Continued)

*Primary Examiner* — Ting Lee
(74) *Attorney, Agent, or Firm* — Birch, Stewart, Kolasch & Birch, LLP

(57) ABSTRACT

A method for operating a terminal according to one embodiment of the present invention comprises the steps of: displaying a text tool window; receiving an inputted character sequence and displaying all of the received character sequences on the displayed text tool window; receiving an input for deleting characters for deleting a portion of the character sequences from among all of the displayed character sequences; receiving an input for recovering characters for recovering the deleted portion of the character sequences; and recovering and displaying the deleted portion of the character sequences according to the received input for recovering characters.

18 Claims, 10 Drawing Sheets

(51) Int. Cl.
*G06F 3/0484* (2013.01)
*G06F 3/023* (2006.01)
*G06F 17/24* (2006.01)

(52) U.S. Cl.
CPC ........ *G06F 3/0486* (2013.01); *G06F 3/04847* (2013.01); *G06F 3/04883* (2013.01); *G06F 3/0488* (2013.01); *G06F 17/24* (2013.01); *H04M 2250/70* (2013.01)

(58) Field of Classification Search
CPC ...... G06F 3/0236; G06F 3/0488; G06F 17/24; H04M 2250/70
See application file for complete search history.

(56) References Cited

U.S. PATENT DOCUMENTS

| | | | |
|---|---|---|---|
| 2009/0044139 A1* | 2/2009 | Shin | G06F 3/0488 715/769 |
| 2011/0219323 A1 | 9/2011 | Woo et al. | |
| 2012/0229493 A1 | 9/2012 | Kim et al. | |
| 2013/0285914 A1* | 10/2013 | Pasquero | G06F 3/0237 345/168 |

FOREIGN PATENT DOCUMENTS

| | | |
|---|---|---|
| KR | 10-0771626 B1 | 10/2007 |
| KR | 10-2011-0100121 A | 9/2011 |

* cited by examiner

FIG.7
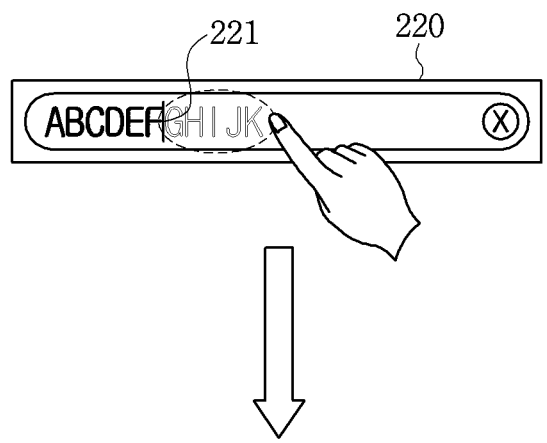
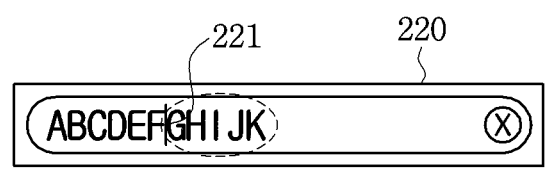
FIG.8
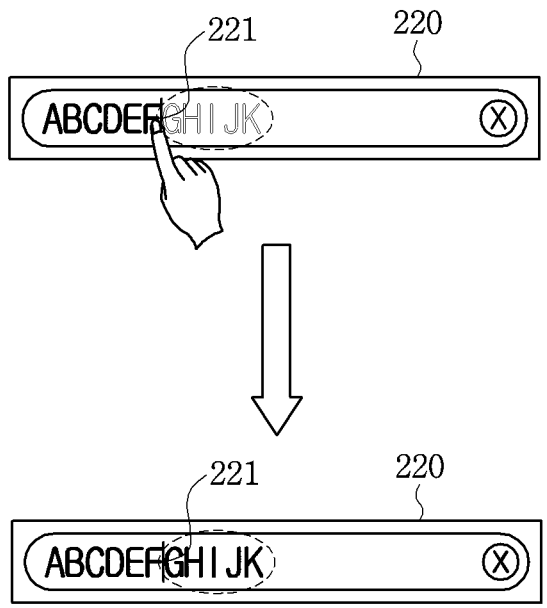

TWICE TIMES TOUCH

TERMINAL AND METHOD FOR OPERATING SAME

TECHNICAL FIELD

The present disclosure herein relates to a terminal and a method for operating the same, and more particularly, to a method of automatically recovering deleted characters.

BACKGROUND ART

Terminals may be classified into mobile/portable terminals and stationary terminals depending on the mobility. The mobile terminals may be further classified into handheld terminals and vehicle mount terminals depending on whether a user may carry them in person.

As the functions of the terminals are diversified, the terminals are being implemented as multimedia players having complex functions including taking pictures, recording video, playing music or video files, gaming, receiving the broadcasting, reproducing articles or magazines.

As such, as the terminals are implemented to function as the multimedia players, users need to input, delete, correct or recover characters.

However, it is true that user interfaces that enable characters to be easily input, deleted, corrected or recovered on the screens of the terminals are not provided.

In the case of a terminal having a touch screen according to a typical embodiment, there is a need to move a cursor to a character having a typographical error to correct the error when input characters have the typographical error. In this case, when the cursor is moved to the character having the error, there is inconvenience in that a portion of a character string that has been correctly input is deleted thus users need to input the deleted portion of the character string one by one.

DISCLOSURE OF THE INVENTION

Technical Problem

Embodiments provide a terminal that may automatically recover deleted characters through a user input, and a method for operating the same.

Technical Solution

In one embodiment, a method of operating a terminal includes displaying a text tool window, receiving a character string input to display a whole of the received character string on the displayed text tool window, receiving a character deletion input for deleting a portion of the displayed character string, receiving a character recovery input for recovering the deleted portion of the character string, and recovering and displaying the deleted portion of the character string according to the receiving of the character recovery input.

In another embodiment, a terminal includes a touch screen comprising a touch sensor and a display unit, and a control unit, wherein the control unit displays a text tool window, receives a character string input to display a whole of the received character string on the displayed text tool window, receives a character deletion input for deleting a portion of the displayed character string, receives a character recovery input for recovering the deleted portion of the character string, recovers and displays the deleted portion of the character string according to the receiving of the character recovery input.

Advantageous Effects

According to an embodiment, deleted character strings may be easily recovered by a simple touch operation.

Also, it is possible to insert a character between characters by a simple touch operation and deleted character strings may be easily recovered after the insertion of the character.

BRIEF DESCRIPTION OF THE DRAWINGS

FIGS. 7 to 10 are diagrams for explaining the processes of receiving a recovery input for recovering deleted characters according to an embodiment and of displaying the deleted characters according to the reception of the recovery input.

MODE FOR CARRYING OUT THE INVENTION

A mobile terminal related to an embodiment is described in detail with reference to the accompanying drawings. Since the suffixes "module" and "unit" for components used in the following description are given and interchanged for only facilitation of description, they do not have distinct meanings or functions.

Terminals described in the present disclosure may include cellular phones, smart phones, laptop computers, digital broadcasting terminals, personal digital assistants (PDAs), portable multimedia players (PMPs), and navigation devices. However, a person skilled in the art may easily appreciate that a configuration according to an embodiment described herein may be applied not only to the mobile terminal but also to a fixed terminal, such as a digital TV or desktop computer, except when it is possible to apply to the mobile terminal only.

A structure of a terminal according to an embodiment is described below with reference to FIG. 1.

Figure 1:
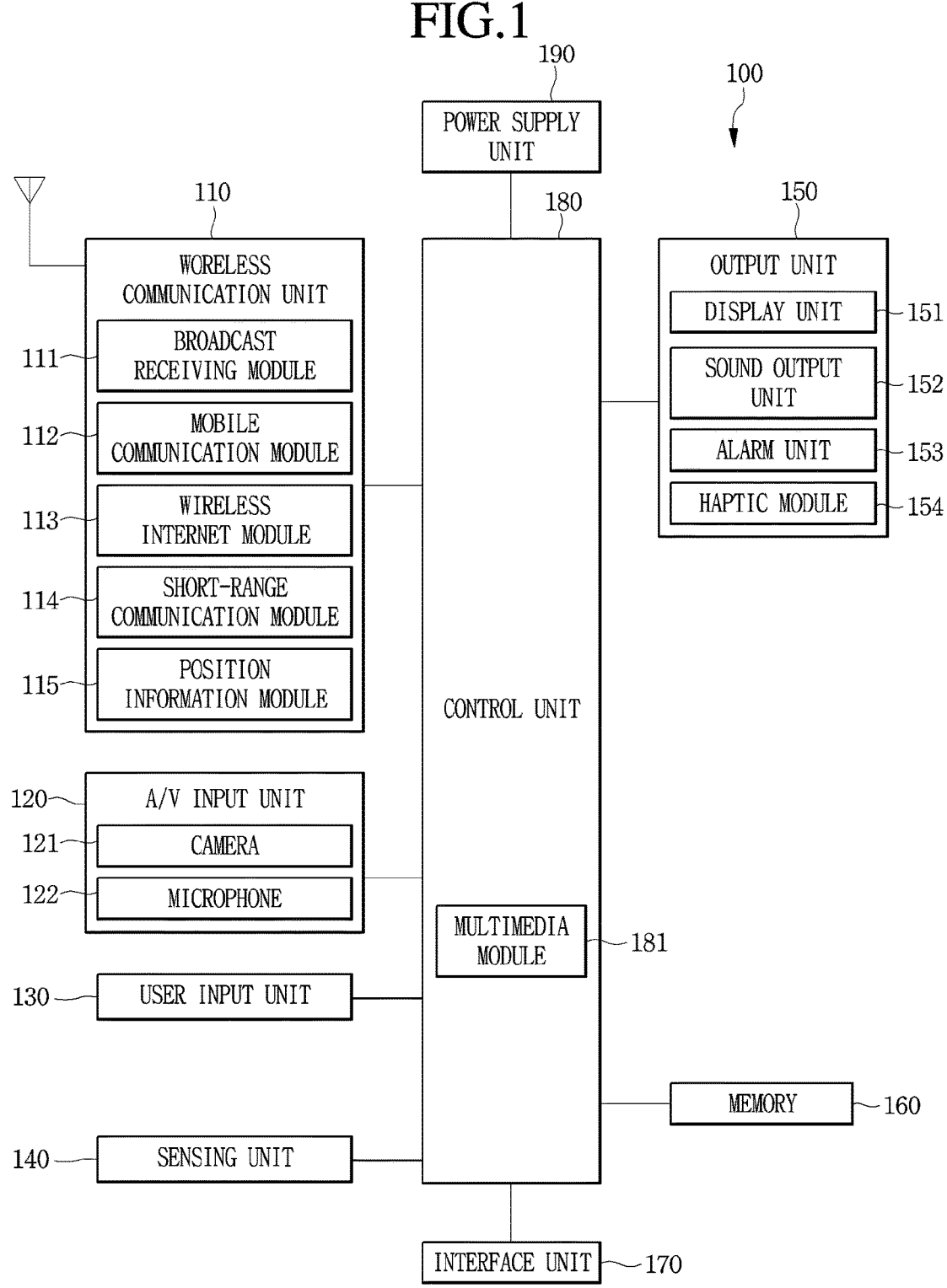
FIG. 1 is a block diagram of a mobile terminal related to an embodiment.

FIG. 1 is a block diagram of a terminal according to an embodiment.

A terminal 100 may include a wireless communication unit 110, an audio/video (AV) input unit 120, a user input unit 130, a sensing unit 140, an output unit 150, a memory 160, an interface unit 170, a control unit 180, and a power supply unit 190. Since the components shown in FIG. 1 are not essential, a mobile terminal having more or less components than those may also be implemented.

In the following, the components above are discussed one by one.

The wireless communication unit 110 may include one or more modules that enable wireless communication between the terminal 100 and a wireless communication system or between the terminal 100 and a network in which the terminal 100 is located. For example, the wireless communication unit 110 may include a broadcast receiving module 111, a mobile communication module 112, a wireless internet module 113, a short range communication module 114, and a position information module 115.

The broadcast receiving module 111 receives a broadcast signal and/or broadcast related information from an external broadcast management server through a broadcast channel.

The broadcast channel may include a satellite channel or a terrestrial channel. The broadcast management server may indicate a server that generates and transmits a broadcast signal and/or broadcast related information, or a server that receives a pre-generated broadcast signal and/or broadcast related information and transmits them to a terminal. The broadcast signal may also include a broadcast signal formed by combining a TV broadcast signal or a radio broadcast signal with a data broadcast signal, in addition to the TV broadcast signal, the radio broadcast signal, and the data broadcast signal.

The broadcast related information may mean information on a broadcast channel, a broadcast program or a broadcast service provider. The broadcast related information may also be provided through a mobile communication network. In this case, the information may be received by the mobile communication module 112.

The broadcast related information may exist in various forms. For example, it may exist in the form of an electronic program guide (EPG) of digital multimedia broadcasting (DMB) or an electronic service guide (ESG) of digital video broadcast-handheld (DVB-H).

The broadcast receiving module 111 may receive a digital broadcast signal by using a digital broadcasting system such as a digital multimedia broadcasting-terrestrial (DMB-T) broadcasting system, a digital multimedia broadcasting-satellite (DMB-S) broadcasting system, a media forward link only (MediaFLO) broadcasting system, a digital video broadcast-handheld (DVB-H) broadcasting system, or an integrated services digital broadcast-terrestrial (ISDB-T) broadcasting system. The broadcast receiving module 111 may also be configured to be suitable for other broadcasting systems in addition to the above-described digital broadcasting systems.

A broadcast signal and/or broadcast related information received through the broadcast receiving module 111 may be stored in the memory 160.

The mobile communication module 112 transmits and receives a wireless signal to and from at least one of a base station, an external terminal and a server on a mobile communication network. The wireless signal may include various types of data depending on the transmission and reception of a voice call signal, a video call signal or a text/multimedia message.

The wireless internet module 113 indicates a module for a wireless Internet connection and may be built in or provided separately from the terminal 100. As a wireless internet technology, wireless LAN (WLAN, Wi-Fi), wireless broadband (Wibro), world interoperability for microwave access (Wimax), high speed downlink packet access (HSDPA) or the like may be used.

The short range communication module. 114 indicates a module for short range communication. As the short range communication technology, Bluetooth, radio frequency identification (RFID), infrared data association (IrDA), ultra wideband (UWB), ZigBee may be used.

The position information module 115 is a module for obtaining the position of a mobile terminal and includes a global position system (GPS) module as a typical example.

Referring to FIG. 1, the AV input unit 120 is used for an audio signal or video signal input and may include a camera 121 and a microphone 122. The camera 121 processes a picture frame of a still image or a video obtained by an image sensor in a video call mode or in an imaging mode. The processed picture frame may be displayed on the display unit 151.

The image frame processed by the camera 121 may be stored in the memory 160 or externally transmitted through the wireless communication unit 110. The camera 121 may be arranged in plurality depending on the usage environment.

The microphone 122 receives an external sound signal in a call mode, a recording mode, or a voice recognition mode and processes the signal into electrical voice data. In the call mode, the voice data obtained through the processing may be converted into a format that enables transmission to a mobile communication base station through the mobile communication module 112, and the data obtained through conversion may be output to the mobile communication base station. Various noise removing algorithms for removing noise generated in the process of receiving an external sound signal may be implemented in the microphone 122.

The user input unit 130 generates input data for the operation control of a user terminal. The user input unit 130 may include a key pad, a dome switch, a (static pressure/capacitive) touch pad, a jog wheel, and a jog switch.

The sensing unit 140 senses the current states of the terminal 100 such as an open/close state of the terminal 100, a position of the terminal 100, whether a user touches the mobile terminal 100, an orientation of the mobile terminal, and acceleration/deceleration of the mobile terminal and generates a sensing signal for controlling the operation of the terminal 100. For example, when the terminal 100 is of a slide phone type, it is possible to sense whether a slide phone is open or close. Moreover, it is also possible to sense whether power is supplied by the power supply unit 190 or whether the interface unit 170 is coupled to an external device. The sensing unit 140 may include a proximity sensor 141.

The output unit 150 is used for generating a visual, auditory or tactile output and may include the display unit 151, a sound output module 152, an alarm unit 153, and a haptic module 154.

The display unit 151 displays (outputs) information processed by the terminal 100. For example, when the mobile terminal is in the call mode, the display unit 151 displays user interface (UI) or graphic user interface (GUI) related to a call. When the terminal 100 is in a video call mode or in an imaging mode, the display unit 151 displays an imaged and/or received image, the UI, or the GUI.

The display unit 40 may include at leas one of a liquid crystal display (LCD), a thin film transistor-liquid crystal display (TFT LCD), an organic light-emitting diode (OLED), a flexible display, and a 3D display.

Some of the displays may be configured as transparent or optically transferable to enable viewing of the outside therethrough. The displays may be referred to as transparent displays which include a transparent OLED (TOLED) as a typical example. The back structure of the display unit 151 may also be configured as optically transferable. Due to such a structure, a user may see objects located at the back side of a terminal body through a region which the display unit 151 of the terminal body occupies.

Depending on the implementation of the terminal 100, the display unit 151 may exist in plurality. For example, a plurality of display units may be arranged on one surface of the terminal 100 to be spaced apart from one another or integrally or may also be respectively arranged on different surfaces thereof.

When the display unit 151 and a sensor sensing a touch operation (hereinafter, referred to as a 'touch sensor') form a mutually layered structure (hereinafter, referred to as a 'touch screen'), the display unit 151 may also be used as an input device in addition to the output device. The touch sensor may be in the form of e.g., a touch film, touch sheet, or touch pad.

The touch sensor may be configured to convert, a change in pressure applied to a specific portion of the display unit 151 or in capacitance generated at a specific portion of the display unit 151, into an electrical input signal. The touch sensor may be configured to be able to detect pressure of touch in addition to position and area of the tough.

When there is a touch input to the touch sensor, a corresponding signal(s) is transmitted to a touch controller. The touch controller processes the signal(s) and then transmits corresponding data to the control unit 180. Accordingly, the control unit 180 may be aware of a touched region of the display unit 151.

Referring to FIG. 1, the proximity sensor 141 may be arranged in the internal region of the mobile terminal, surrounded by the touch screen, or near the touch screen. The proximity sensor 141 indicates a sensor that detects the absence and presence of an object approaching a certain detection face or an object near the proximity sensor without mechanical contact by using the force of an electromagnetic field or an infrared ray. The proximity sensor 141 has a longer lifetime than a contact sensor and also has a wide application.

Examples of the proximity sensor 141 include a transmissive photoelectric sensor, a direct reflective photoelectric sensor, a mirror reflective photoelectric sensor, a high-frequency oscillating proximity sensor, a capacitive proximity sensor, a magnetic proximity sensor, and an infrared proximity sensor. When the touch screen is of a capacitive type, it is configured to detect the proximity of a pointer by using a change in electric field due to the proximity of the pointer. In this case, the touch screen (touch sensor) may be classified as a proximity sensor.

For the convenience of description, an action of recognizing that the pointer approaches the touch screen and is located on the touch screen without a contact is referred to as a "proximity touch" and an action made when the pointer is in actual contact with the touch screen is referred to as a "contact touch". The position where the proximity touch is made with the pointer over the touch screen means the position where the pointer is perpendicular to the touch screen when the pointer makes the proximity touch.

The proximity sensor senses the proximity touch and proximity touch patterns (e.g., a proximity touch distance, a proximity touch direction, a proximity touch speed, a proximity touch time, a proximity touch position, and proximity touch moving state). Information corresponding to the sensed proximity touch operation and proximity touch patterns may be displayed on the touch screen.

The sound output module 152 may output audio data received from the wireless communication unit 110 or stored in the memory 160 in a call signal receiving mode, a call mode, a recording mode, a voice recognition mode, and a broadcast receiving mode. The sound output module 152 also outputs a sound signal related to a function that is performed by the terminal 100 (e.g., a call signal incoming tone and a message incoming tone). The sound output module 152 may include a receiver, a speaker, a buzzer or the like.

The alarm unit 153 outputs a signal for indicating generation of an event of the terminal 100. Examples of an event generated by the mobile terminal include call signal reception, message reception, a key signal input and a touch input. The alarm unit 153 may also output signals in forms different from a video signal or audio signal, for example, a signal for indicating generation of an event through vibration. The video signal or audio signal may also be output through the display unit 151 or the voice output module 152 and thus the components 151 and 152 may be classified as portions of the alarm unit 153.

The haptic module 154 generates various tactile effects that a user may feel. A typical example of a tactile effect generated by the haptic module 154 is vibration. It is possible to control the intensity and patterns of the vibration generated by the haptic module 154. For example, different vibrations may be synthesized and output or may be sequentially output.

In addition to the vibration, the haptic module 154 may generate various tactile effects such as an effect of stimulus due to a pin arrangement making a motion perpendicular to a contact skin surface, an effect of stimulus due to a jet force or suction force of air through a jet hole or a suction hole, an effect of stimulus due to rubbing a skin surface, an effect of stimulus due to an electrode contact, an effect of stimulus due to an electrostatic force, and an effect due to a reproduction of cold and warmth using a device capable of absorbing or radiating heat.

The haptic module 154 may not only transmit tactile effects through direct contact but may also enable the user to feel tactile effects through a kinesthetic sense of the user's fingers or arms. Depending on the configuration of the mobile terminal 100, the haptic module 154 may exist in plurality.

The memory 160 may store programs for the operation of the control unit 180 and temporarily store data (e.g., a phone book, a message, a still image, and a video) that is input and output. The memory 160 may store data on sound and vibrations in various patterns that are output when there is a touch input on the touch screen.

The memory 160 may include as a storage medium, at least one of a flash memory, a hard disk type memory, a multimedia card micro type memory, a card type memory (for example, a secure digital (SD) or extreme digital (XD) memory), a random access memory (RAM), a static RAM (SRAM), a read-only memory (ROM), an electrically erasable PROM (EEPROM), a programmable ROM (PROM), a magnetic memory, a magnetic disk and an optical disk. The terminal 100 may also operate in relation to a web storage that performs a storage function of the memory 160 over the internet.

The interface unit 170 functions as a path to all external devices connected to the terminal 100. The interface unit 170 receives data from external devices, receives power and transmits the data or power to each component of the terminal 100, or transmits data from the terminal 100 to the external devices. For example, the interface unit 170 may include a wired/wireless headset port, an external charger port, a wired/wireless data port, a memory card port, a port connecting a device that includes an identification module, an audio input and output (I/O) port, an video I/O port, and an earphone port.

The identification module is a chip storing various pieces of information for authenticating authority to use the terminal 100 and may include a user identify module (UIM), subscriber identity module (SIM), and a universal subscriber identity module (USIM). A device that includes the identification module (hereinafter, referred to as an "identification device") may be manufactured in the form of a smart card. Thus, the identification device may be connected to the terminal 100 via a port.

When the mobile terminal 100 is connect to an external cradle, the interface unit may be a path through which power from the cradle is supplied to the mobile terminal 100 or may be a path through which various command signals input at the cradle by a user are transmitted to the mobile terminal. The power or the various command signals input from the cradle may operate as a signal for recognizing that the mobile terminal is correctly installed in the cradle.

The control unit 180 typically controls the overall operations of the mobile terminal. For example, the control unit 180 performs the control and processing associated with voice calls, data communication, and video calls. The control unit 180 may also include a multimedia module 181 for playing multimedia. The multimedia module 181 may be implemented in the control unit 180, or may be implemented separately from the control unit (180).

The controller 180 may perform pattern recognition processing capable of recognizing a handwritten input or a picture-drawing input performed on the touch screen, as a character and image.

The power supply unit 190 receives internal power or external power under the control of the control unit 180 and provides power required for the operation of each of components.

Various embodiments described herein may be implemented in e.g., a recording medium that may be read with a computer or a similar device by using software, hardware or a combination thereof.

According to a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers), microprocessors, and other electrical units for performing functions. In some cases, the embodiments may be implemented by the control unit 180.

According to software implementation, embodiments such as procedures or functions may be implemented along with a separate software module that performs at least one function or operation. Software codes may be implemented by software applications that are written in proper programming languages. The software codes may be stored in the memory 160 and may be executed by the control unit 180.

In the following, the operating method of a terminal according to an embodiment is described with reference to FIGS. 2 to 10.

In the following, a character may mean a single character unit and a character string may mean a unit including two or more characters.

Figure 2:
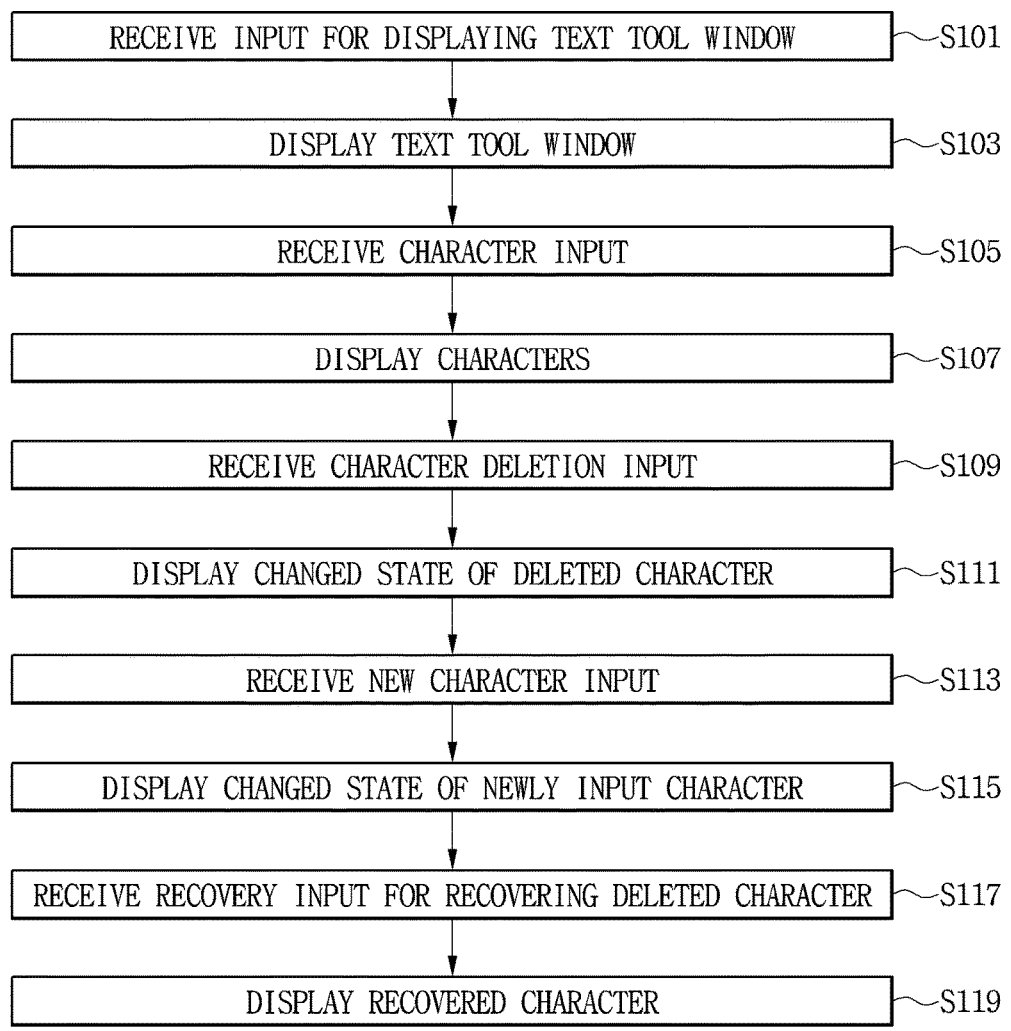
FIG. 2 is a flowchart of a method of recovering a character by a terminal according to an embodiment.

FIG. 2 is a flowchart of a method of recovering a character by a terminal according to an embodiment.

The control unit 180 receives a user input for the displaying of a text tool window in step S101. The control unit 180 may receive the user input for the displaying of the text tool window through a touch sensor. In another embodiment, the control unit 180 may receive the user input for the displaying of the text tool window through an external input device such as a keyboard or mouse.

The control unit 180 displays the text tool window through the display unit 151 according to the user input received for the displaying of the text tool window in step S103. The text tool window is described with reference to FIG. 3.

Figure 3:
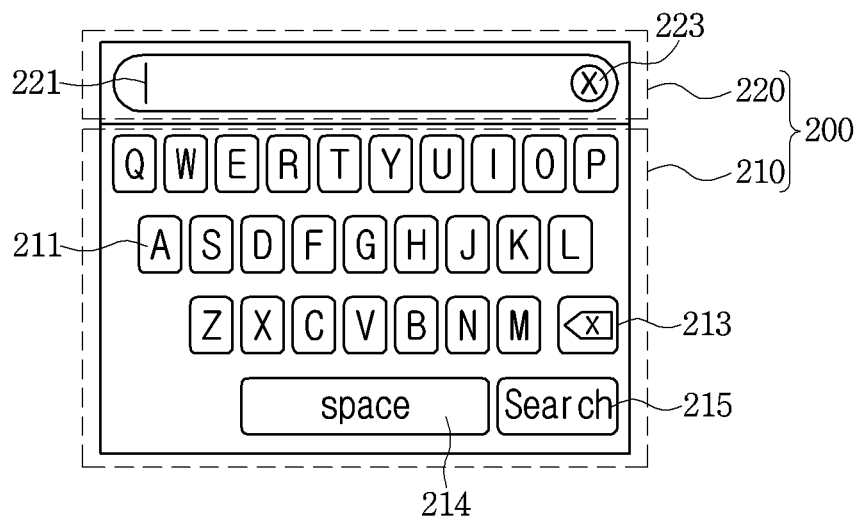
FIG. 3 shows the process of displaying a text tool window according to an embodiment.

FIG. 3 shows the process of displaying the text tool window according to an embodiment.

Referring to FIG. 3, the control unit 180 may display a text tool window 200 through a display unit (not shown) when a user input for the displaying of the text tool window 200 is received. The text tool window 200 may include a text input region 210 and a text display region 220.

The text input region 210 may be a region including a plurality of buttons that perform operations for correcting or recovering a character to be input or a character input to the text display region 220 through the user input.

The text input region 210 may include letter buttons 211 and a plurality of function buttons 213 to 215. The letter buttons 211 may include buttons for consonants and vowels for Hangul, alphabet letters, numbers, and symbols.

The plurality of function buttons 213 to 215 may include a delete button 213, a space button 214, and a search button 215.

When the delete button 213 is selected by a user input, one character in the character string displayed on the text display region 220 may be deleted. In this case, as a cursor 221 moves to the left side, one character may be deleted. When the space button 214 is selected by the user input, no characters are displayed on the text display region 210 and the cursor 221 to be described below may move to the right by one space. When the search button 215 is selected by the user input, a search for information on the character string displayed on the text display region 220 may be performed.

The plurality of function buttons may further include buttons that may perform other various operations.

The text display region 220 may be a region for displaying the process of correcting or recovering a character to be input or a character input through a user input. The text display region 220 may be located over the text input region 210.

The cursor 221 and a delete button 223 that delete all characters may be displayed on the text display region 220. The cursor 221 may blink for a certain time, and when a character is displayed on the text display region 220 by a user input, the cursor may move to the right of the displayed character. That is, the cursor 221 functions as an indicator that indicates the position of a character to be input to a user.

When the delete button 223 that delete all characters is selected by the user input, all the characters displayed on the text display region 220 may be deleted.

Refer back to FIG. 2.

The control unit 180 enables the text tool window 200 to enter a general mode and receives a character input from a user in step S105. In an embodiment, the general mode is a mode different from a character insertion mode to be described below and may mean a mode in which it is possible to input, delete or recover a character. Referring back to FIG. 3 for description, the control unit 180 may receive a character input through the selection of the letter button 211 in the text input region 210. In an embodiment, the selection of the letter button 211 may be received by a user touch without limitation thereto and the selection of the letter button 211 may be received by an external input device such as a keyboard or mouse.

Refer back to FIG. 2.

The control unit 180 displays the character input according to the reception of the character input through the text tool window 200 in step S107. Related descriptions are provided with reference to FIG. 4.

Figure 4:
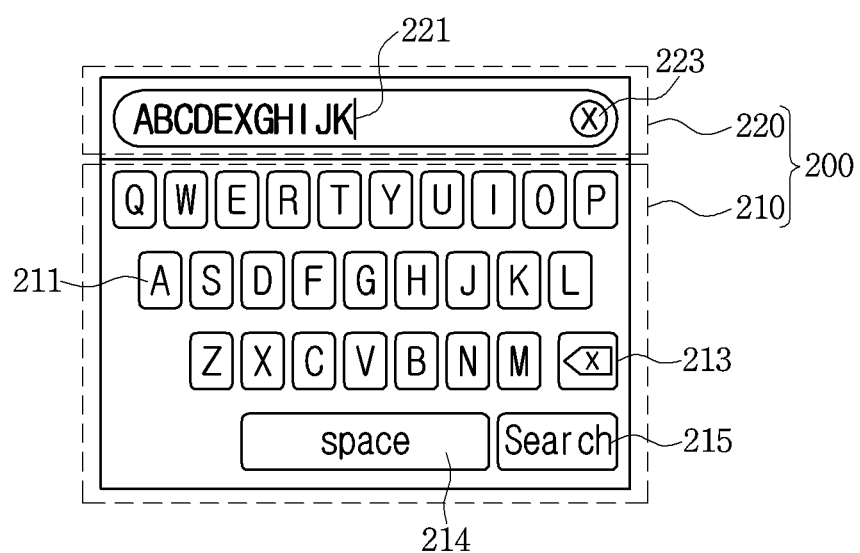
FIG. 4 is a diagram for explaining the process of displaying a character according to character input reception according to an embodiment.

FIG. 4 is a diagram for explaining the process of displaying a character according to character input reception according to an embodiment.

FIG. 4 shows when the character string 'ABCDEXGHIJK' is displayed on the text display region 220 by the selective reception of the letter button 211. That is, each of characters may be input according to the selection of the letter button 211 by a user so that the character string may be displayed. In this case, the cursor 221 moves to the right of the letter K that has been input last according to the input of the character string.

Refer back to FIG. 2.

Then, the control unit 180 receives a character deletion input for deleting a portion of the characters in step S109 while the characters are displayed on the text display region 220, and displays the changed state of the deleted portion of the characters in step S111. Related descriptions are provided with reference to FIG. 5.

Figure 5:
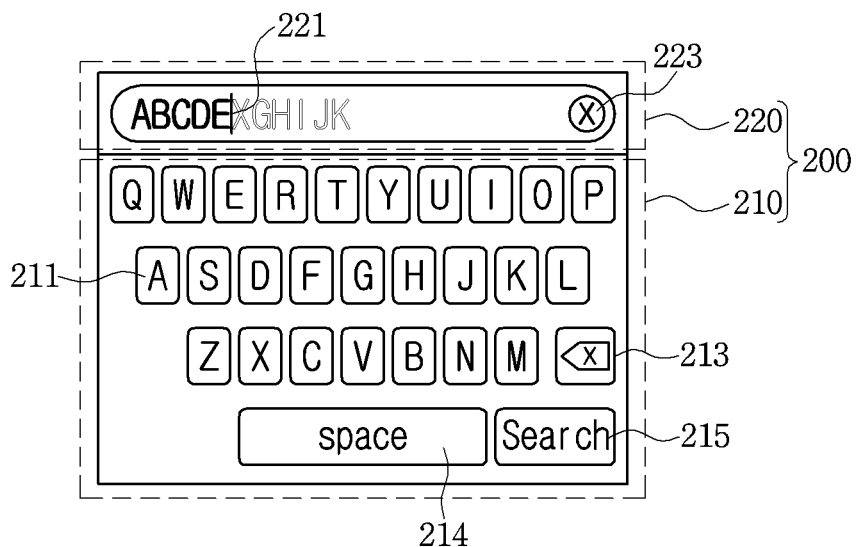
FIG. 5 is a diagram for explaining the process of deleting a character according to character input reception according to an embodiment.

FIG. 5 is a diagram for explaining the process of deleting a character according to character input reception according to an embodiment.

The following description is provided on the assumption that the letter 'X' in the character string 'ABCDEXGHIJK' has an error. An embodiment is described on the assumption that one letter has an error but does not need to be limited thereto, and it is also possible to apply when there are errors in consecutive characters or between characters in the character string.

FIG. 5 shows the process of deleting the portion 'XGHIJK' from the character string 'ABCDEXGHIJK' according to a user's character deletion input in the text display region 220. In an embodiment, the character deletion input may be performed by the selective reception of the delete button 213. That is, when a user touches the delete button 213 many times to approach a character to be deleted in order to correct an error, the cursor 221 may move to a position corresponding to the number of times the delete button 213 is pressed, deleting characters. In this example, the deleted character string 'XGHIJK' may be displayed in a different color from the remaining character string 'ABCDE'. That is, when the remaining character string 'ABODE' is displayed in a black color, the deleted character string 'XGHIJK' may be displayed in a gray color. However, an embodiment does not need to be limited thereto and the deleted character string may be displayed in many manners. For example, it may also be displayed as a transparent background or only the contour of each character may be displayed. If the deleted character string is displayed as the transparent background, a user may check the deleted character string with his or her eyes.

In an embodiment, the character deletion input may be performed by using other methods except for the delete button 213. That is, after the user touches the cursor 221 for a certain time, drags and drops the cursor 221 to the position of a character to be deleted and then inputs the delete button 213, it is possible to delete the character string 'XGHIJK' that the user wants to delete.

Refer back to FIG. 2.

The control unit 180 receives a new character input through a user input in step S113 and displays the changed state of the newly input character in step S115. Related descriptions are provided with reference to FIG. 6.

Figure 6:
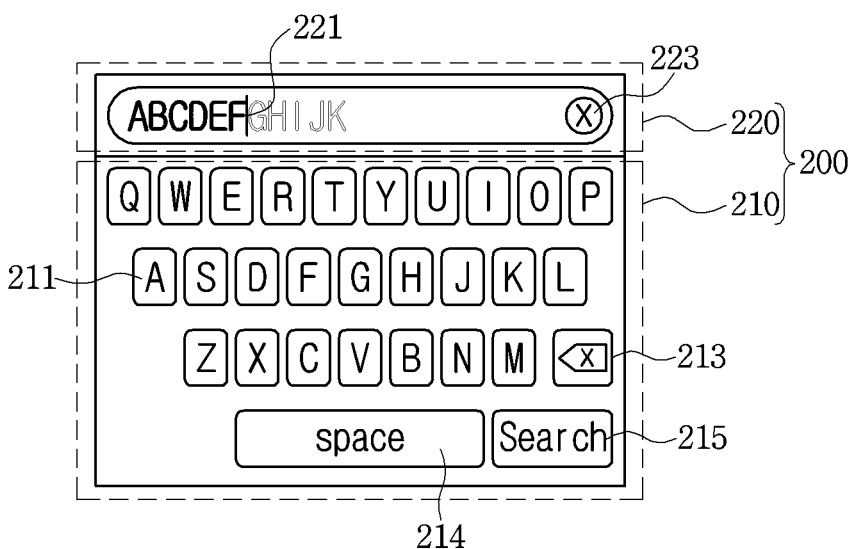
FIG. 6 is a diagram for explaining the processes of receiving a new character input while characters are partially deleted and of displaying the changed state of the newly input character according to an embodiment.

FIG. 6 is a diagram for explaining the processes of receiving a new character input while characters are partially deleted and of displaying the changed state of the newly input character according to an embodiment.

Referring to FIG. 6, a user may touch the letter button 211 for the letter 'F' at the position of the letter 'X' having a typographical error to display the new letter 'F' on the text display region 220. In this case, the newly input letter 'F' may be displayed in the same color as the remaining character string 'ABCDE'. In another embodiment, the newly input letter 'F' may be displayed in different colors from the remaining character string 'ABCDE' and the deleted character string 'GHIJK' to enable a user to visually recognize an error corrected state. According to the input of the new letter 'F', the cursor 221 moves to the right of the displayed letter 'F'.

Refer back to FIG. 2.

The control unit 180 receives a recovery input for recovering the deleted characters in step S117 while the changed state of the newly input character is displayed, and recovers the deleted characters according to the reception of the recovery input to display the recovered characters on the display unit 151 in step S119. Various methods may be used for the reception of the recovery input. In an embodiment, the control unit 180 may automatically recover the deleted characters when an input of selecting a side of the deleted character string in the text display region 220 is received. In this case, the deleted characters may be displayed in the same color in the remaining characters.

In another embodiment, the control unit 180 may automatically recover the deleted characters when an input of touching the newly input character for a certain time is received.

In another embodiment, the control unit 180 may automatically recover the deleted character when an input of selecting the cursor 221 located on the right of the newly input character is received and then an input of dragging and dropping the cursor to the end of the deleted character string is received.

In another embodiment, the control unit 180 may automatically recover the deleted character string when an input of selecting a separate edition completion button is received.

The processes of receiving the recovery input for recovering the deleted characters and of recovering the deleted characters according to the reception of the recovery input are described with reference to FIGS. 7 to 10.

FIGS. 7 to 10 are diagrams for explaining the processes of receiving a recovery input for recovering deleted characters according to an embodiment and of displaying the deleted characters according to the reception of the recovery input.

Firstly, FIG. 7 shows an embodiment where the deleted characters are automatically recovered when an input of selecting a side of the deleted character string in the text display region 220 is received.

Referring to FIG. 7, when a user deletes a letter having a typographical error, inputs a new letter 'F' and then touches the end of the deleted character string 'GHIJK', the deleted character string 'GHIJK' may be recovered. What the deleted character string 'GHIJK' is recovered may mean that it is displayed in the same color as the remaining character string 'ABCDE'. That is, when the end of the deleted character string 'GHIJK' is touched while the remaining character string 'ABCDE' is displayed in a black color and the deleted character string 'GHIJK' is displayed as a transparent background, the deleted character string 'GHIJK' may be displayed in the black color.

The time for which the touch is maintained may be one second, which is however an example. In an embodiment, when a user touches a portion of the deleted character string 'GHIJK' instead of the end of the deleted character string 'GHIJK', the deleted character string 'GHIJK' may be recovered.

When there is a typographical error in the middle of the character string, the user may correct the error through such a process and easily recover the deleted character string by a simple touch operation without a need to re-input the deleted character string. Thus, since it is easy to correct and recover characters, user convenience may increase.

Next, an embodiment is described with reference to FIG. 8 where deleted characters are automatically recovered when an input of touching a newly input character for a certain time is received.

Referring to FIG. 8, when a user deletes a letter having a typographical error, inputs a new letter 'F' and then touches where the input letter 'F' is located, the deleted character string 'GHIJK' may be recovered. What the deleted character string 'GHIJK' is recovered may mean that it is displayed in the same color as the remaining character string 'ABCDE'.

Next, an embodiment is described with reference to FIG. 9 where deleted characters are automatically recovered when an input of selecting the cursor 221 located on the right of the newly input character is received and then an input of dragging and dropping a cursor to the end of a deleted character string is received.

Figure 9:
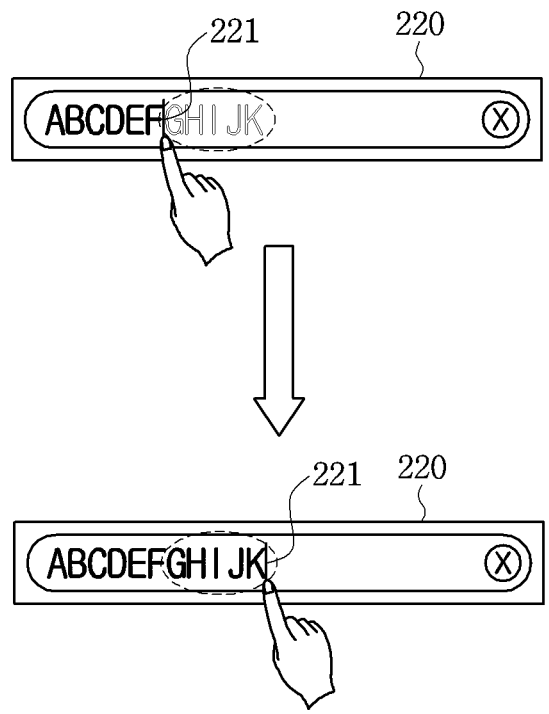

Referring to FIG. 9, when a user deletes a letter having a typographical error, inputs a new letter 'F', touches the cursor 221 located on the right of the input letter 'F', dragging and dropping the cursor 221 to the right of the letter 'K' at which the deleted character string 'GHIJK' ends, the deleted character string 'GHIJK' may be automatically recovered. What the deleted character string 'GHIJK' is recovered may mean that it is displayed in the same color as the remaining character string 'ABODE'.

Next, an embodiment is described with reference to FIG. 10 where a deleted character string is automatically recovered when an input of selecting an edition completion button is received.

Figure 10:
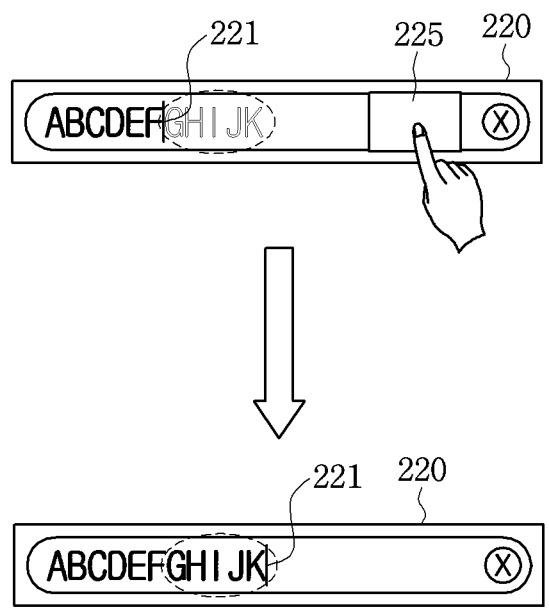

Referring to FIG. 10, when a user deletes a letter having a typographical error, inputs a new letter 'F' and then touches the edition completion button 225, the deleted character string 'GHIJK' may be automatically recovered. What the deleted character string 'GHIJK' is recovered may mean that it is displayed in the same color as the remaining character string 'ABCDE'.

The automatic recovery of the deleted character string that has been described in FIGS. 7 to 10 may be applied even after a portion of the deleted character string is input. That is, when the user corrects the letter having the typographical error to the letter 'F', inputs the letter 'G' being a portion of the deleted character string 'GHIJK' and then performs an automatic recovery operation, the character string 'HIJK' may also be recovered automatically.

Next, a method of operating a terminal according to another embodiment is described with reference to FIGS. 11 to 17.

Figure 11:
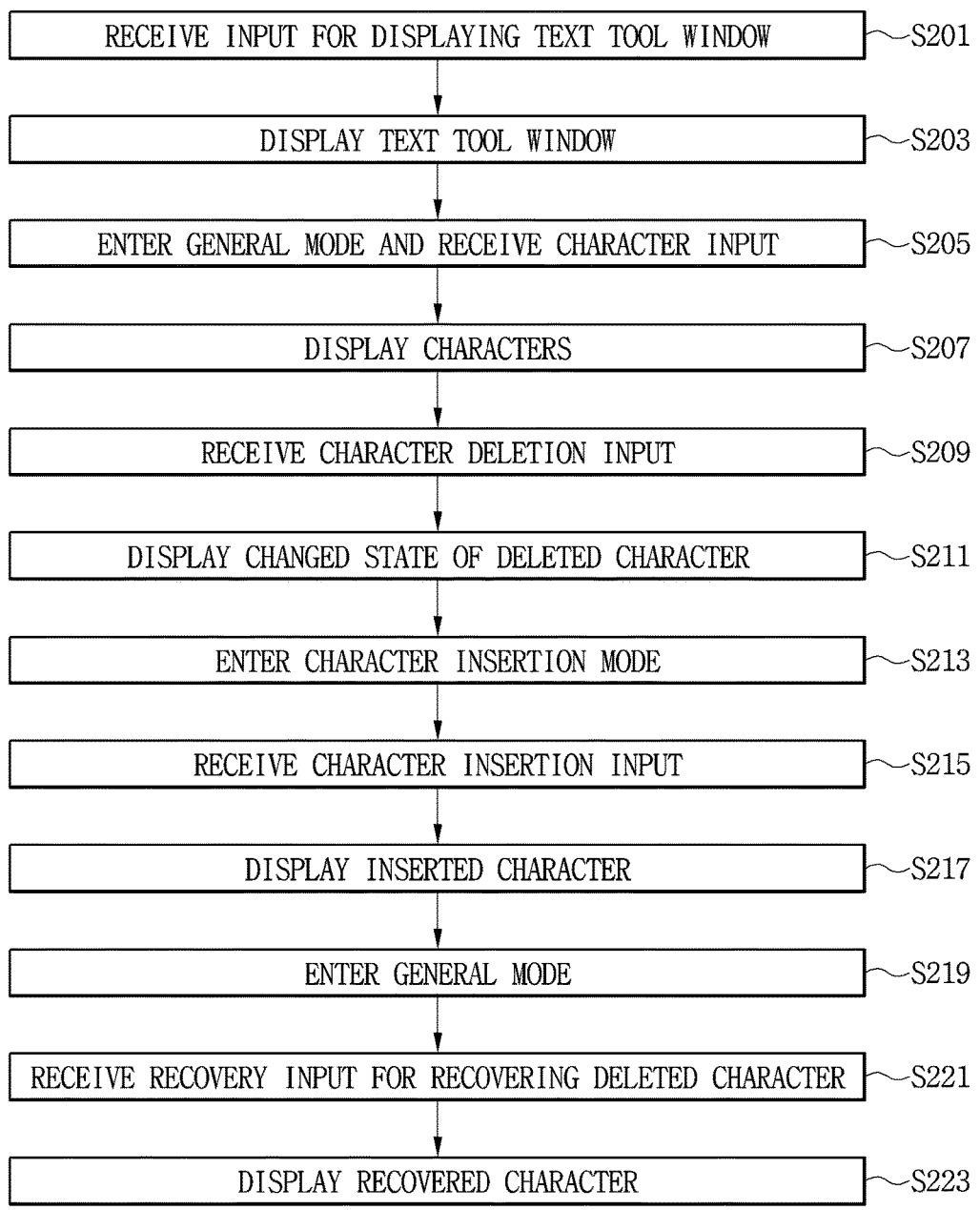
FIG. 11 is a flowchart of a method of recovering a character by a terminal according to another embodiment.

FIG. 11 is a flowchart of a method of recovering a character by a terminal according to another embodiment.

Since steps S201 to S211 are the same as steps S101 to S111 that have been described in FIGS. 2 to 10, their detailed descriptions are omitted.

The control unit 180 enables the terminal 100 to enter a character insertion mode in step S213. In an embodiment, the character insertion mode is a mode in which it is possible to insert a character between characters, and may be different from a general mode that has been described in FIG. 2. In an embodiment, the character insertion mode may be entered by the second successive touch of the cursor 221 or by the selection of a separate character insertion button. Related descriptions are provided with reference to FIG. 12.

Figure 12:
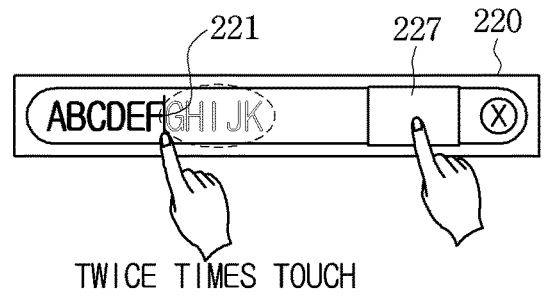
FIG. 12 is a diagram for explaining the process of entering, by a terminal, a character insertion mode according to an embodiment.

FIG. 12 is a diagram for explaining the process of entering, by a terminal, a character insertion mode according to an embodiment.

FIG. 12 may be a process that is performed after the process in FIG. 6.

Referring to FIG. 12, when a user deletes a letter having a typographical error, inputs a new letter 'F', and then touches the cursor 221 twice times successively, a mode may be changed from a general mode to a character insertion mode. When the mode of the document tool window 200 enters the character insertion mode, the color of the cursor 221 may also be changed and the shape of the cursor 221 may also be changed so that the vertical length of the cursor 221 becomes longer. Also, when the mode of the document tool window 200 enters the character insertion mode, the blinking of the cursor 221 may also disappear.

In another embodiment, when a user deletes a letter having a typographical error, inputs a new letter 'F', and then touches the character insertion button 227, the mode of the document tool window may be changed from the general mode to the character insertion mode.

In another embodiment, when the user touches the cursor 221 for a preset time, the mode of the document tool window may be changed from the general mode to the character insertion mode. In this example, the preset time may be two seconds, which are only an example.

Refer back to FIG. 11.

The control unit 180 receives a character insertion input through a user input in step S215 while the terminal 100 has entered the character insertion mode, and displays a character inserted according to the character insertion input in step S217. In this case, the character inserted through the user input may be located between the remaining character string and the deleted character string. Related descriptions are provided with reference to FIG. 13.

Figure 13:
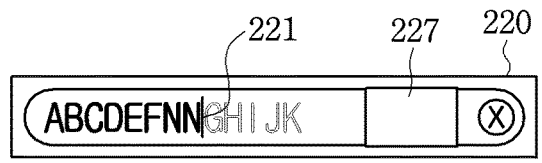
FIG. 13 is a diagram for explaining the process of displaying an input character through a user input while a text tool window has entered a character insertion mode according to an embodiment.

FIG. 13 is a diagram for explaining the process of displaying a character input through a user input while a document tool window has entered a character insertion mode according to an embodiment.

Referring to FIG. 13, the characters 'NN' may be displayed in the text display region 220 when the user inputs the characters 'NN' by selecting the letter button 211 in FIG. 12. In this case, since the document tool window 200 operates in the character insertion mode, the inserted character string 'NN' may be displayed between the letter 'F' newly input or obtained through correction and the deleted character string 'GHIJK'. If the letter 'F' obtained through correction is not input, the inserted characters 'NN' may be displayed between the remaining character string 'ABCDE' and the deleted character string 'GHIJK'.

In an embodiment, the inserted character string 'NN' may be displayed in the same color as the remaining character string 'ABCDE' and the newly input letter 'F' or in different color therefrom. When the inserted character string 'NN' is displayed in a different color from the character string 'ABCDE', it may also be displayed in a different color from the deleted character string 'GHIJK'.

The embodiment of FIG. 13 may be different from the embodiment of FIG. 6. That is, in the general mode of FIG. 6, the newly input letter 'F' is displayed on the position of the deleted letter 'X' but in the character insertion mode, the newly input letters 'NN' are not displayed on the positions of the deleted letters 'GH' but are inserted and then displayed.

As will be described below, a user may recover a character deleted when inserting a character into the necessary position of a character string, without re-inputting the deleted character.

Refer back to FIG. 11.

The control unit 180 enables the text tool window 200 to enter a general mode through a user input in step S219. The general mode is a mode different from the above character insertion mode and may mean a mode in which it is possible to input, delete or recover a character. The entrance into the general mode may be performed in the same manner as the entrance into the character insertion mode. That is, when in FIG. 13, the cursor 221 is touched two times successively, the mode of the document tool window 200 may be changed from the character insertion mode to the general mode.

In another embodiment, when a user touches the character insertion button 227, the mode of the document tool window 200 may be changed from the character insertion mode to the general mode.

The control unit 180 receives a recovery input for recovering the deleted characters in step S221 while the document tool window 200 has entered the general mode, and recovers the deleted characters according to the reception of the recovery input to display the recovered characters on the display unit 151 in step S223. Various methods may be used for the reception of the recovery input. In an embodiment, the control unit 180 may automatically recover the deleted characters when an input of selecting a side of a deleted character string in the text display region 220 is received. In this case, the deleted characters may be displayed in the same color in the remaining characters.

In another embodiment, the control unit 180 may automatically recover the deleted characters when an input of touching a portion of the recovered character string for a certain time is received.

In another embodiment, the control unit 180 may automatically recover the deleted characters when an input of selecting the cursor 221 located on the right of the inserted character string is received and then an input of dragging and dropping the cursor to the end of the deleted character string is received.

In another embodiment, the control unit 180 may automatically recover the deleted character string when an input of selecting a separate edition completion button is received.

The processes of receiving the recovery input for recovering the deleted characters and of recovering the deleted characters according to the reception of the recovery input are described with reference to FIGS. 14 to 17.

FIGS. 14 to 17 are diagrams for explaining the processes of receiving a recovery input for recovering deleted characters and of displaying the deleted characters according to the reception of the recovery input according to another embodiment.

Figure 14:
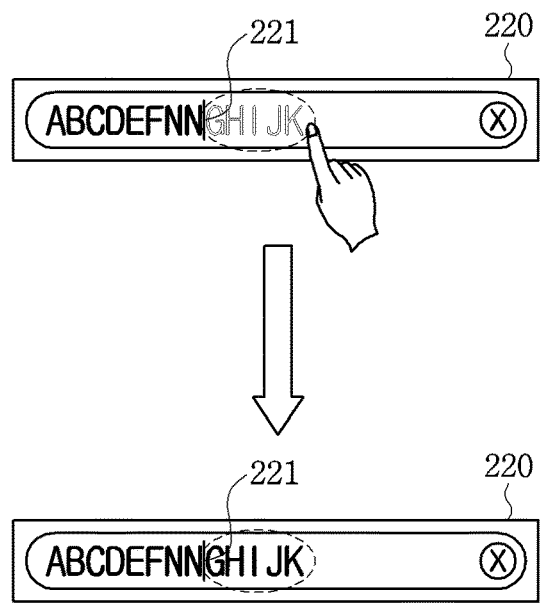
FIGS. 14 to 17 are diagrams for explaining the processes of receiving a recovery input for recovering deleted characters and of displaying the deleted characters according to the reception of the recovery input according to another embodiment.

Firstly, FIG. 14 shows an embodiment where deleted characters are automatically recovered when an input of selecting a side of a deleted character string in the text display region 220 is received.

Referring to FIG. 14, when a user inserts the character string 'NN' and then touches the end of the deleted character string 'GHIJK', the deleted character string 'GHIJK' may be recovered. What the deleted character string 'GHIJK' is recovered may mean that it is displayed in the same color as the remaining character string 'ABCDE'. That is, when the end of the deleted character string 'GHIJK' is touched while the remaining character string 'ABCDE' is displayed in black color and the deleted character string 'GHIJK' is displayed as a transparent background, the deleted character string 'GHIJK' may be displayed in a black color.

The time for which the touch is maintained may be one second, which is however an example. In an embodiment, when a user touches a portion of the deleted character string 'GHIJK' instead of the end of the deleted character string 'GHIJK', the deleted character string 'GHIJK' may be recovered.

When there is a typographical error in the middle of the character string and there is a need to further insert a character, the user may correct the error through such a process, insert the character and then easily recover the deleted character string by a simple touch operation without a need to re-input the deleted character string. Thus, since it is easy to correct and recover characters, user convenience may increase.

Next, an embodiment is described with reference to FIG. 15 where deleted characters are automatically recovered when an input of touching an inserted character for a certain time is received.

Figure 15:
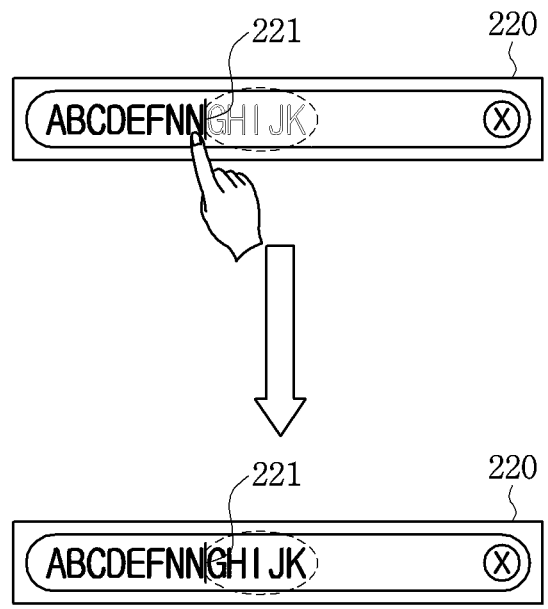

Referring to FIG. 15, when a user inserts the character string 'NN' and then touches a place where the portion 'N' of the inserted character string is located, the deleted character string 'GHIJK' may be recovered.

What the deleted character string 'GHIJK' is recovered may mean that it is displayed in the same color as the remaining character string 'ABCDE'. In another embodiment, when a user touches a place where the letter 'F' obtained through correction is located, the deleted character string 'GHIJK' may be recovered. What the deleted character string 'GHIJK' is recovered may mean that it is displayed in the same color as the remaining character string 'ABCDE'.

Next, an embodiment is described with reference to FIG. 16 where deleted characters are automatically recovered when an input of selecting the cursor 221 located on the right of inserted characters is received and then an input of dragging and dropping a cursor to the end of a deleted character string is received.

Figure 16:
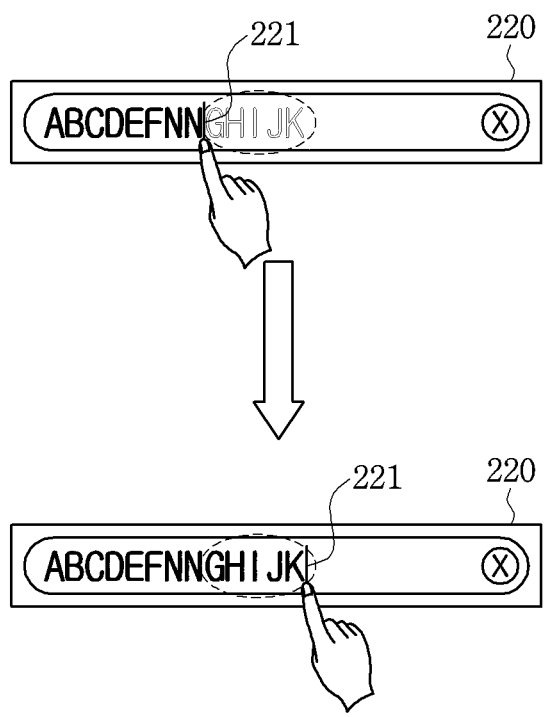

Referring to FIG. 16, when a user inserts the character string 'NN', touches the cursor 221 located on the right of the inserted character string 'NN', drags and drops the cursor 221 to the right of the letter 'K' at which the deleted character string 'GHIJK' ends, the deleted character string 'GHIJK' may be automatically recovered. What the deleted character string 'GHIJK' is recovered may mean that it is displayed in the same color as the remaining character string 'ABCDE'.

Next, an embodiment is described with reference to FIG. 17 where a deleted character string is automatically recovered when an input of selecting a separate edition completion button is received.

Figure 17:
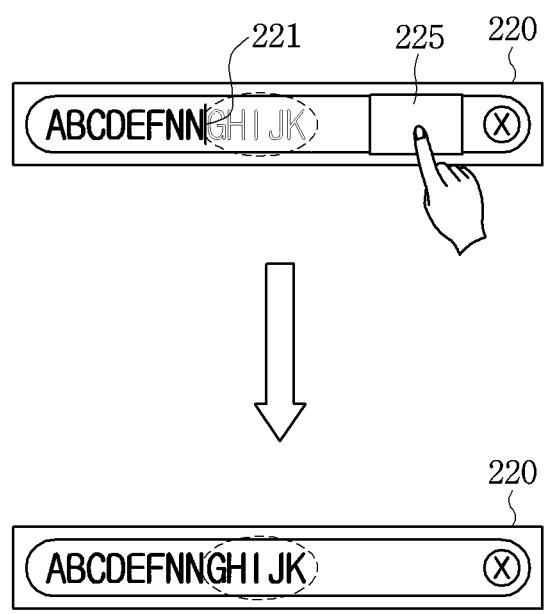

Referring to FIG. 17, when a user inserts the character string 'NN' and then touches the edition completion button 225, the deleted character string 'GHIJK' may be automatically recovered. What the deleted character string 'GHIJK' is recovered may mean that it is displayed in the same color as the remaining character string 'ABCDE'.

Various embodiments may be applied to fields in which a character is input and applied. For example, applications may include when a telephone number is input and corrected through a terminal, when a message is input and corrected through a messenger application, when a text message such as SMS or MMS is input or corrected, or when a login or search is performed while a web browser operates.

According to an embodiment, the above-described method may also be embodied as processor readable codes on a program-recorded medium. Examples of the processor readable medium are a ROM, a RAM, a CD-ROM, a magnetic tape, a floppy disk, and an optical data storage device, and the method is also implemented in the form of a carrier wave (such as data transmission through the Internet).

The above-described mobile terminal is not limited to the configuration and method of described embodiments, and some or all of the embodiments may also be selectively combined so that various variations may be implemented.

The invention claimed is:

1. A method of operating a terminal, the method comprising:
    displaying a text tool window;
    receiving a character string input to display a whole of the received character string on the displayed text tool window;
    receiving a character deletion input for deleting a portion of the displayed character string;
    displaying the deleted portion of the character string in a different color from a remaining character string according to the receiving of the character deletion input, wherein the deleted portion of the character string is displayed as a transparent background;
    receiving a character recovery input for recovering the deleted portion of the character string, wherein the receiving of the character recovery input comprises receiving a selective input of a cursor located at a front end of the deleted portion of the character string, and receiving a drag and drop operation input to a rear end of the deleted portion of the character string while maintaining the selective input of the cursor on a touch screen of the terminal; and
    recovering and displaying the deleted portion of the character string according to the receiving of the character recovery input.

2. The method according to claim 1, wherein the receiving of the character recovery input comprises receiving the character recovery input through an input of selecting a side of the deleted character string.

3. The method according to claim 1, further comprising, after the receiving of the character deletion input, receiving a new character input,
    wherein the receiving of the character recovery input comprises receiving the character recovery input through an input of selecting the newly input character for a preset time.

4. The method according to claim 1, further comprising displaying, the cursor moving according to input of the character string, on the text tool window.

5. The method according to claim 1, wherein the receiving of the character recovery input comprises receiving the character recovery input according to a selection of an edition completion button displayed on the text tool window.

6. The method according to claim 1, wherein the displaying of the deleted portion of the character string in the different color from the remaining character string comprises displaying the remaining character string in a black color.

7. The method according to claim 1, further comprising receiving an insertion mode input for inserting a character between the deletion portion of the character string and a remaining character string in the whole character string.

8. The method according to claim 7, further comprising:
    receiving an input of a character that is inserted between the deleted portion of the character string and the remaining character string; and
    displaying an inserted character according to the receiving of the character input.

9. The method according to claim 8, further comprising displaying the displayed inserted character in a same color as the remaining character string.

10. The method according to claim 8, wherein the receiving of the character recovery input comprises receiving the character recovery input by selecting a side of the deleted character string.

11. The method according to claim 8, wherein the receiving of the character recovery input comprises receiving the character recovery input through an input of selecting the inserted and displayed character for a preset time.

12. The method according to claim 8, further comprising displaying, the cursor moving according to an input of the character string, on the text tool window,
    wherein the receiving of the character recovery input comprises:
    receiving a selective input of the cursor located at a front end of the deleted portion of the character string, and receiving a drag and drop operation input to a rear end of the deleted portion of the character string while maintaining the selective input of the cursor.

13. The method according to claim 8, wherein the receiving of the character recovery input comprises receiving the character recovery input according to a selection of an edition completion button displayed on the text tool window.

14. The method according to claim 1, further comprising displaying, a cursor moving according to an input of the character string, on the text tool window,
    wherein the receiving of the insertion mode input comprises receiving an input of selecting the cursor two times successively.

15. The method according to claim 1, further comprising displaying, a cursor moving according to an input of the character string, on the text tool window,
    wherein the receiving of the insertion mode input comprises receiving an input of selecting the cursor for a preset time.

16. A terminal comprising:
    a touch screen comprising a touch sensor and a display unit;
    and
    a control unit,
    wherein the control unit displays a text tool window, receives a character string input to display a whole of the received character string on the displayed text tool window, receives a character deletion input for deleting a portion of the displayed character string, displays the deleted portion of the character string in a different color from a remaining character string according to the receiving of the character deletion input, wherein the deleted portion of the character string is displayed as a transparent background, receives a character recovery input for receiving the deleted portion of the character string, wherein the receiving of the character recovery input comprises receiving a selective input of a cursor located at a front end of the deleted portion of the character string, and receiving a drag operation input to a rear end of the deleted portion of the character string while maintaining the selective input of the cursor on the touch screen of the terminal, recovers and displays the deleted portion of the character string according to the receiving of the character recovery input.

17. The terminal according to claim 16, wherein the control unit selects a side of the deleted character string to receive the character recovery input.

18. The terminal according to claim 16, wherein the control unit receives the character recovery input through an input of selecting a newly input character for a preset time.

* * * * *